(No Model.)
A. E. BROWN.
DRILLING TOOL.
No. 401,537. Patented Apr. 16, 1889.
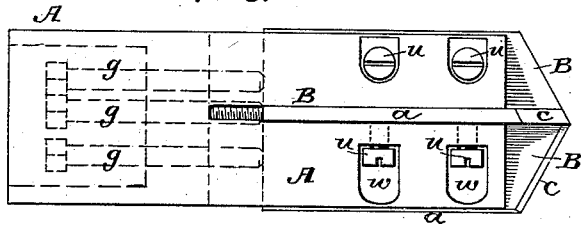
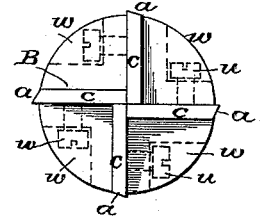
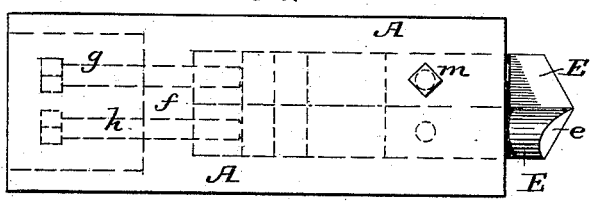
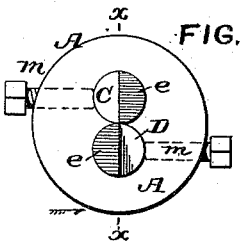
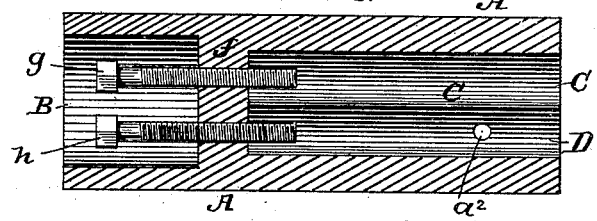
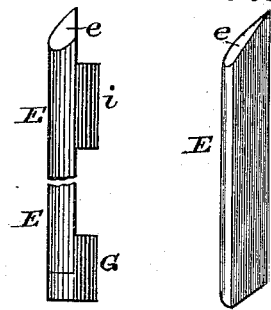
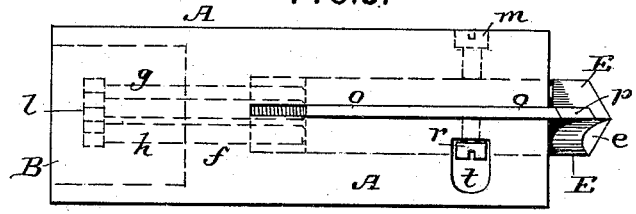
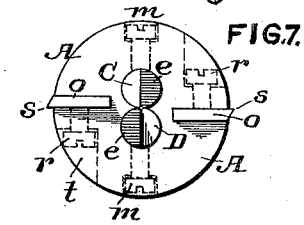
Witnesses
J. Henry Kaiser
Victor J. Evans.
Inventor
Alexander E. Brown
By J. N. McIntire
Attorney

UNITED STATES PATENT OFFICE.

ALEXANDER E. BROWN, OF CLEVELAND, OHIO.

DRILLING-TOOL.

SPECIFICATION forming part of Letters Patent No. 401,537, dated April 16, 1889.

Application filed January 2, 1889. Serial No. 295,228. (No model.)

*To all whom it may concern:*

Be it known that I, ALEXANDER E. BROWN, of Cleveland, in the county of Cuyahoga and State of Ohio, have invented a new and useful Improvement in Drilling-Tools; and I do hereby declare that the following is a full, clear, and exact description thereof, reference being had to the accompanying drawings, making part of this application.

Previous to my invention the construction of all forms of drills or boring-tools, whether of the twist-drill pattern or chucking-drill form, has been such that in the removal of the stock for the purpose of drilling or boring the hole a portion of said stock at the center or axis of motion of the tool had to be removed by a crushing operation, which is both injurious to the drill or tool and necessitates the expenditure of more power than would be necessary to remove the same amount of stock by a clean-cutting operation, and on account of this principle of construction and mode of operation common to all drills heretofore made it has been customary and necessary for the mechanic or operator in boring holes of comparatively large size to first either bore a small hole with a comparatively small drill, or at least to start the boring of a hole with a small drill, in order that the larger drill used to follow in making a hole of the requisite diameter might be properly centered or started in the drilling or boring operation. Every machinist is, I presume, familiar with the fact that in practice great difficulties or impediments are encountered in attempting to bore or drill a hole either by a chucking operation or otherwise with drills of the usual form whenever the stock to be drilled presents a surface for the drill to commence operation upon that is either irregular (as is often the case in cast articles to be drilled) or has some irregular or eccentrically-arranged cavities in the stock to be drilled in the immediate vicinity of the starting-point of the tool, and these difficulties or impediments are serious obstacles to the use of drilling-tools as heretofore made.

I propose to provide for use a tool or implement for drilling or boring holes (which may be used either for centering stock for subsequent action of larger drills or for boring holes of any magnitude at one operation,) which shall be capable of performing a cutting or drilling operation on the stock from the outermost portion of its cutting-edges clean in to the axial line or central point of contact of the drilling-tool with the stock to be removed, so as to avoid all crushing action at the center of the drill so destructive of the boring-tool itself and tending so often to render impracticable the perfect centering of the drilling-tool at the commencement of its operation.

To this main end and object my invention may be said to consist, primarily, in a drilling or boring tool which comprises two or more cutting lips or edges, each of which extends from the axis of motion of the tool outwardly, all as will be hereinafter more fully explained, and as will be more specifically pointed out or defined in the claims of this specification; and my invention may be said to further consist in certain specific means for effecting the adjustment of certain parts of the drilling-tool, and in certain peculiarities of detail construction, all of which will be hereinafter more fully explained, and which will be more particularly pointed out in the claims of this specification.

To enable those skilled in the art to which my invention relates to make and use the same, I will now proceed to describe my improved drilling or boring tool, referring by letter to the accompanying drawings, which form part of this specification, and in which I have shown my invention carried out in some of the forms in which I have so far successfully practiced it.

In the drawings, Figure 1 is a side view or elevation of a drilling-tool made according to my invention. Fig. 2 is an end view of the same. Fig. 3 is a vertical longitudinal section at the line $xx$ of Fig. 2, looking in the direction indicated in the last-named figure. Fig. 4 is a detail view of one of the cutters and certain combined parts detached from the other portions of the tool, and Fig. 5 is a detail perspective view of one of the cutting-tools detached from all other parts. At Fig. 4 the cutting-tool is shown as having a portion broken out for the purpose of somewhat condensing this figure of the drawings, and in these several figures the same parts, wherever they occur, will be found designated by the same letters of reference. At Fig. 6 I have shown in side view a modification of my invention, and at Fig. 7 is shown an end view of the same. Figs. 8 and 9 are respectively a side elevation and an end view of still another modification.

Referring now particularly to Figs. 1 to 5, inclusive, A is what we may designate as the "tool-stock," which in the case shown is in the form of a solid cylinder having a cylindrical depression or socket, B, at its rearmost portion and having two cylindrical holes, C and D, bored into it from its foremost end, which holes are of about equal depth, have their axial lines coincident with the diameter of the stock A, and are formed so as to have their circumferences just touch each other, (see particularly Fig. 2,) said holes C and D being adapted to receive and contain the two cutting or boring tools E and certain parts connected therewith, as will be presently explained. Each of these tools E is formed, preferably, of a semi-cylindrical piece of solid Mushet steel or other self-hardening steel, about corresponding in size to one-half of the cylindrical hole C or D, within which it is to be placed and held, and each of said cutting-tools E is formed, as shown, with its working or cutting end e beveled off in two directions, so that when the two tools shall have been arranged with their flat sides in opposite directions, but in a perfect plane with each other, as shown, these beveled or cutting edges will form a proper angle with each other (see Fig. 1) to perform the functions of a drilling-tool which will operate to cut from the outer extremities of the two cutting-edges at the ends of said devices E clean up to the axial line of the drill and tool stock A, at which line, as shown, the said cutting-edges meet to form the apex of the drill.

G are set-blocks, one of which is applied, as shown, to the lower or innermost end of each of the tools E to receive the abutting action of the end of one of the set-screws g h, which are threaded in the solid portion f of the tool-stock A, and which operate to set up or push outwardly said pieces G for the purpose of forcing outwardly in turn each of the semi-cylindrical tool-pieces E.

i are semi-cylindrical blocks, which are arranged in about the positions shown relatively to the tools E for the purpose of, so to speak, filling the bores of the holes C and D at certain localities and to receive the pressure exerted by the ends of the set-screws m, which are threaded transversely in the tool-stock A, and which operate to set up said pieces i, and thereby securely clamp within the holes C and D, respectively, the cutters or tool-pieces E, when the latter shall have first been properly adjusted endwise, of course, to have their cutting ends or lips in the proper relative position.

In the operation of a tool, such as shown and so far described, after the cutting-lips or ends e of the tools E shall have been properly adjusted to the relative position exhibited at Fig. 1 and 2 and they are securely clamped by the set-screws m, the stock or metal to be drilled or penetrated will be first acted upon at the point at which the apex of the combined tools E comes into contact with the work, and the stock will be removed by the cutting action of the obliquely-arranged lips or edges e of said tools as the said tools, together with the stock A, in which they are confined, shall be rotated on an axial line coincident, of course, with the apex of said combined tools and with the axial line of the cylindrical tool-stock A.

It will be understood that in the operation thus of such a tool, as shown and so far described, there will be no tendency to a lateral displacement of the tool when the latter begins its drilling or boring operation, since the first point of contact with the work will be coincident with the axis of motion of the revolving tool, and the removal of the stock will be effected by the cutting action of the oppositely-inclined cutting-lips, which act with equalizing strain in the operation of removing or boring out the material.

In the form of tool shown the hole drilled can only be of a depth corresponding to the degree of projection of the tool-pieces beyond the end of the tool-stock A; and hence this form of tool is best adapted to drilling preliminary depressions to center larger drilling-tools on the same or the old-fashioned principle; but with slight modification the tool shown and described may be rendered capable of drilling holes of any requisite depth or clear through the stock or piece of work to be operated upon.

By making the tool-pieces E of semi-cylindrical stock, as shown, I am not only enabled to use economically the ordinary round-bar stub-steel of commerce, but cheaply produce a perfect cutting-tool, which, by reason of its semi-cylindrical form or shape, perfectly clears itself at the outermost portion of its cutting lips or edges.

In the modifications shown at Figs. 6 and 7 the tool-stock A has cut in it longitudinal slots of the proper width and length to permit the placement within said slots, in an almost radial direction, of two supplemental cutters or tool-pieces (marked o,) the protruding or projecting ends of which p are beveled off, so as to have their obliquity such as to lie in oblique lines, substantially like those in which lie the cutting-edges e of the tool-pieces E, and preferably so arranged as to cut in substantially the same rotary path as do the edges of said tools E. These plate-like cutters o are arranged, however, to extend widthwise, somewhat beyond the outer perimeter or periphery of the tool-stock A, and have their protruding or projecting edges also beveled to form longitudinally-arranged cutting-edges, (see Fig. 7,) such as shown at s s.

Thus modified my improved drilling-tool, it will be seen, is rendered capable of boring a hole somewhat larger in diameter than the diameter of the tool-stock A, and hence to any requisite depth or through the work being operated upon, since the said tool-stock A can follow along within the hole bored out by the drilling action or cutting of the combined tool-pieces E and o.

In the modification of my invention shown at Figs. 8 and 9 the tool-stock A is formed, it will be seen, with four slots or seats running from points in its periphery about equidistant circumferentially to the vicinity of the center of the tool-stock, which slots are adapted to receive and seat four plate-like cutters, B, which are arranged so as to have the cutting-edges of their ends located in radii of a circle having its center coincident with the axis of the tool-stock A. Said plate-like cutters B have their ends beveled at c, both widthwise and in the direction of the thickness of the plates, so that the obliquely-arranged cutting-edges of the four ends will form right lines meeting at an apex coincident with the axis or center of motion of the rotatory tool-stock, while the laterally-protruding beveled edges a of these four tools project slightly, as shown, beyond the periphery of the tool-stock, so that the boring-tool can drill a hole of any requisite depth or a hole clean through the stock or piece of work, the tool-stock A following within the bored hole after the same fashion as just above explained with reference to the form of tool shown at Figs. 6 and 7.

In the tool shown at Figs. 8 and 9 the four cutter-plates B are adjustable separately endwise by means of set-screws g, and they are each securely clamped or held in position laterally by means of the set-screws n, the edges of which are depressed, so to speak, within the recesses or cut-outs w of the tool-stock A, so as to clear the wall of the hole or bore made in the work or material by the cutters B.

Of course other modifications may be made in the details of construction, and various changes may be made in the sizes, proportions, and numbers of the cutting devices and other parts of the tool without changing its novel principle of action or losing its material advantage, so long as in either form adapted merely for centering or making preliminary impressions to start other drills into, or for forming holes of the final size into or through a piece of stock, the principle of construction and mode of operation are such, as hereinbefore described, that the cutting-tools operate to remove the stock from the farthest point from the center of motion clean down to the axis of motion, and thus avoid any crushing or breaking action, such as common to all other drilling tools or devices made prior to my invention, so far as my knowledge extends.

Having now so fully explained the principle of construction and mode of operation of my improved drill or boring-tool that those skilled in the art can understand and practice my invention, either in one of the forms herein shown and described or under some mere modification thereof, what I claim as new, and desire to secure by Letters Patent, is—

1. A drilling-tool comprising two or more separate cutters, the operative edges of which exactly meet (at their inner ends) at a point which lies in the axis of motion of the tool, all substantially as and for the purpose set forth.

2. In a drilling-tool of the kind shown and described, the combination, with the tool-stock A, having formed therein suitable seats or receptacles for the same, of two tool pieces or cutters, E E, each formed of a semi-cylindrical piece of steel having its working ends beveled or tapered in two directions, substantially as and for the purposes hereinbefore set forth.

3. In combination with the tool-stock A, two or more cutters or tool-pieces having their working ends projected beyond said tool-stock, and means for adjusting said pieces endwise and also securely clamping them in place laterally, all substantially as and for the purposes hereinbefore set forth.

In witness whereof I have hereunto set my hand this 14th day of December, 1888.

ALEXANDER E. BROWN.

In presence of—
   GEORGE C. WING,
   J. V. SMITH.